United States Patent [19]

Perling

[11] Patent Number: 5,569,371
[45] Date of Patent: Oct. 29, 1996

[54] SYSTEM FOR UNDERWATER NAVIGATION AND CONTROL OF MOBILE SWIMMING POOL FILTER

[75] Inventor: Jeremy Perling, Kibbutz Yizreel, Israel

[73] Assignee: Maytronics Ltd., Kibbutz Yizreel, Israel

[21] Appl. No.: 422,819

[22] Filed: Apr. 17, 1995

[30] Foreign Application Priority Data

Apr. 22, 1994 [IL] Israel ......................................... 109394

[51] Int. Cl.⁶ .......................... B01D 33/80; B01D 35/02
[52] U.S. Cl. .................. 210/85; 15/1.7; 15/319; 210/94; 210/143; 210/169; 210/416.2
[58] Field of Search .............................. 210/85, 94, 143, 210/169, 416.2; 15/1.7, 319; 395/88, 94; 364/516; 901/1, 44, 45, 46

[56] References Cited

U.S. PATENT DOCUMENTS

| | | | |
|---|---|---|---|
| 4,589,986 | 5/1986 | Greskovics et al. | 210/169 |
| 4,900,432 | 2/1990 | Arnold | 210/169 |
| 5,028,321 | 7/1991 | Stone et al. | 210/169 |
| 5,086,535 | 2/1992 | Grossmeyer et al. | 15/319 |
| 5,093,949 | 3/1992 | Sloan | 15/1.7 |
| 5,256,207 | 10/1993 | Sommer | 15/1.7 |
| 5,435,031 | 7/1995 | Minami et al. | 15/1.7 |

*Primary Examiner*—Joseph W. Drodge
*Attorney, Agent, or Firm*—McAulay Fisher Nissen Goldberg & Kiel, LLP

[57] ABSTRACT

An underwater navigation and control system for a swimming pool cleaning robot, having a driver, an impeller, a filter and a processor for controlling the driver and a signal-producing circuit. The system further includes a signal-detecting circuit mounted on the pool, an interface located on the ground in proximity to the pool and comprising a detector for receiving and processing data from the detecting circuit and for transmitting signals to the robot's processor. Determination of the actual robot location is performed by triangulation in which the stationary triangulation base is defined by at least two spaced-apart signal detectors and the mobile triangle apex is constituted by the signal-producing circuit carried by the robot.

15 Claims, 9 Drawing Sheets

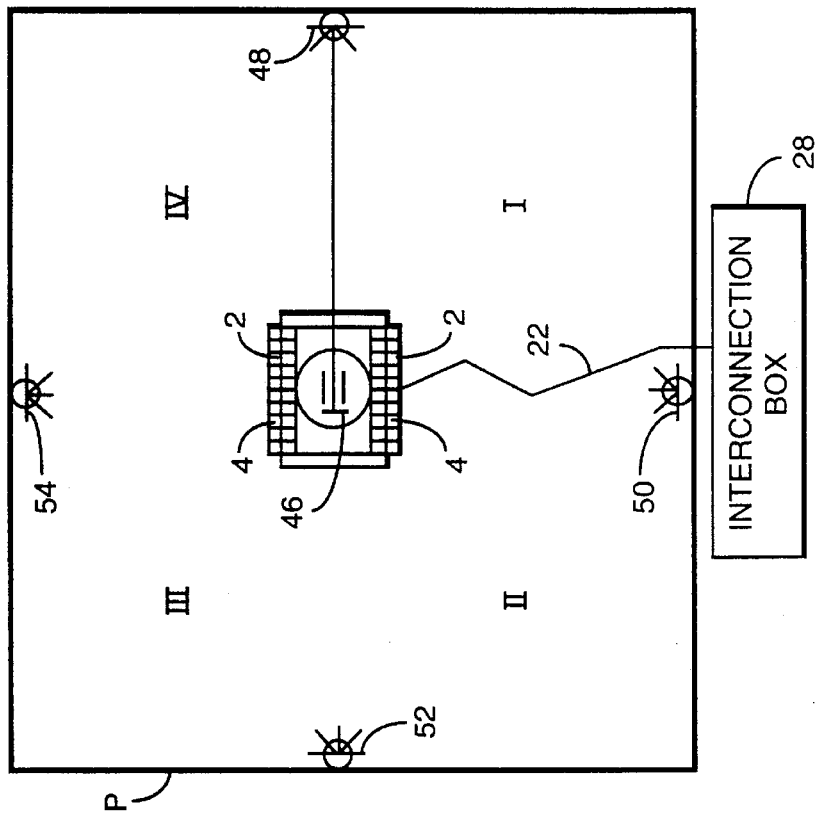
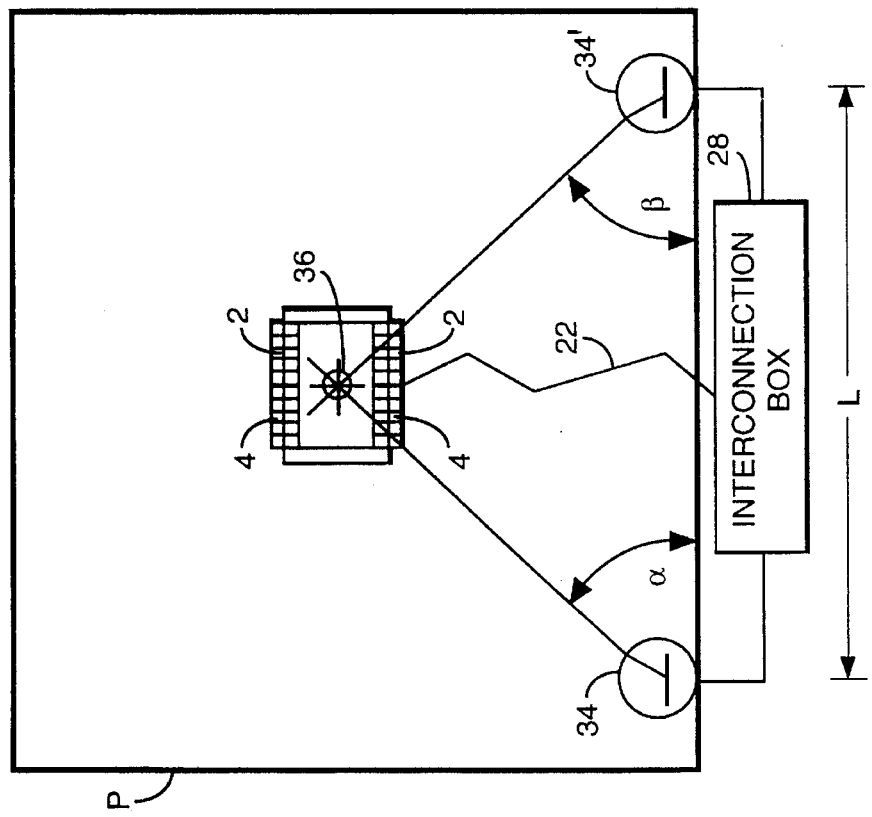

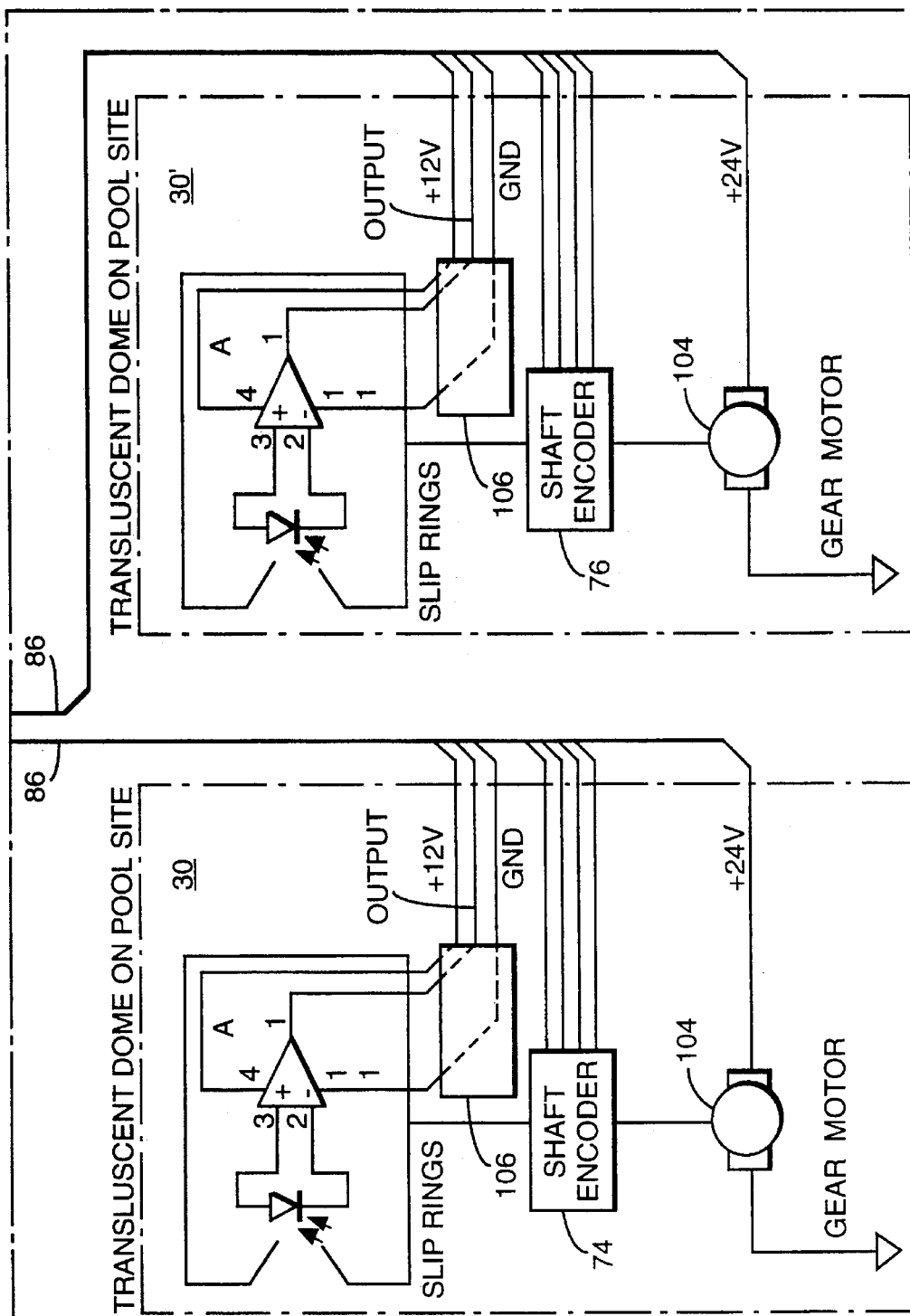
Fig.11(Cont i).

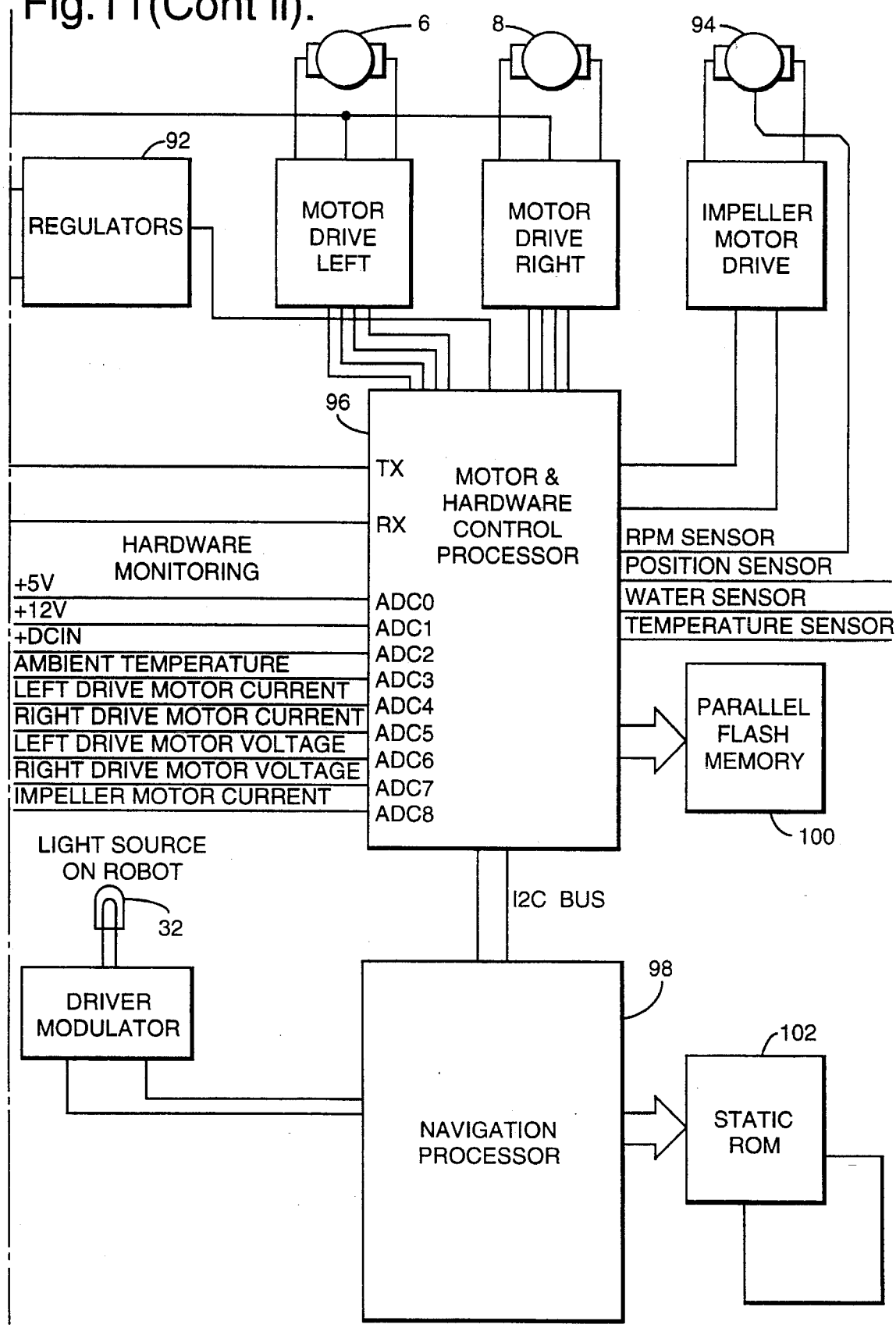
Fig.11(Cont ii).

SYSTEM FOR UNDERWATER NAVIGATION AND CONTROL OF MOBILE SWIMMING POOL FILTER

The present invention relates to an underwater navigation and control system for a pool-cleaning robot. It relates also to a method for carrying out such navigation and control of a pool-cleaning robot.

Pool-cleaning robots are known, an example being the commercially available, self-propelled "Dolphin"$^R$, suitable for swimming pools of a size of up to 25×20 m. Cleaning is based on the statistical probability that the device, crawling along the pool floor, guided by a random algorithm, will eventually cover the entire floor area. Because of the probabilistic nature of the concept, the cleaning of a relatively small pool of the above size will take up to 12 hours. While this may not be a serious disadvantage for those small, mainly private pools which can afford to be inoperative for such a long period of time, it is totally inacceptable for large (50×40 m) public swimming pools, which operate continuously for 16 hours, 7 days a week.

It is thus one of the objects of the present invention to provide a system employing a pool-cleaning robot that operates according to a non-statistical principle, being navigated along a predetermined path adapted to the specific dimensions and shape of a given pool and that will therefore be capable of cleaning large-size swimming pools in the few hours per day during which these pools are inoperative.

According to the invention, the above object is achieved by providing an underwater navigation and control system for a swimming pool cleaning robot, comprising locomotion means for said robot, adapted to produce a steerable motion thereof; impeller means for drawing solids-entraining water from the floor of said pool through filter means, and returning said water after filtering to said pool; microprocessor means to control said locomotion means to the effect of causing said robot to follow a preprogrammed route, and to generate correction signals whenever, at a given instant, the actual location of said robot deviates from the location as prescribed, for that instant, by said preprogrammed route; a signal-producing means carried by said robot; at least two signal-detecting means fixedly mounted in spaced-apart relationship at, or in close proximity to, at least one side of said pool and being acted upon by said signal-producing means; interconnection means located on the ground in proximity to said pool and comprising a detector processing logic to receive and process data from said detecting means for transmission to said robot microprocessor means, wherein determination of said actual robot location is performed by triangulation in which the stationary triangulation base is defined by said at least two spaced-apart signal-detecting means and the mobile triangle apex is constituted by said signal-producing means carried by said robot.

There is also provided a method for controlling the underwater navigation of a pool-cleaning robot, comprising the steps of providing a steerable, electrically-driven pool-cleaning robot equipped with at least one on-board microprocessor having at least one memory; preparing, according to the dimensions of said pool, a map of the route to be taken by said robot for substantially covering the entire pool; converting said map into a plurality of coordinates; entering said coordinates into said memory; determining the actual instantaneous position of said robot in said pool by triangulation, in which the apex of the triangulation triangle is a signal-producing means carried by said robot, and the stationary triangulation base is defined by at least two signal-detecting means fixedly mounted in spaced-apart relationship at at least one side of said pool and exposed to said signal-producing means; comparing the actual position of said robot as determined by triangulation with the robot position as prescribed for the same instant by said route map, and, based on the difference between the actual and the prescribed positions of said robot, producing signals to correct said actual position.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 6 shows the layout and components of a third embodiment of the system;

FIG. 8 shows the layout and components of a fourth embodiment of the system;

Figure 1:
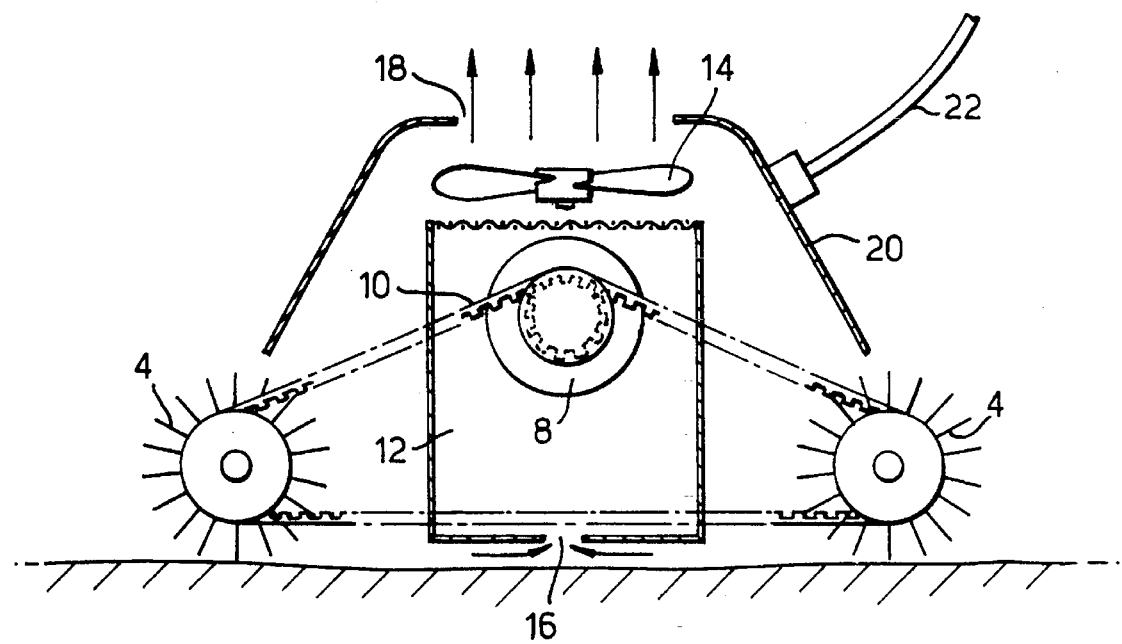
FIG. 1 is a schematic elevational view of the robot used in the system according to the invention.
Figure 2:
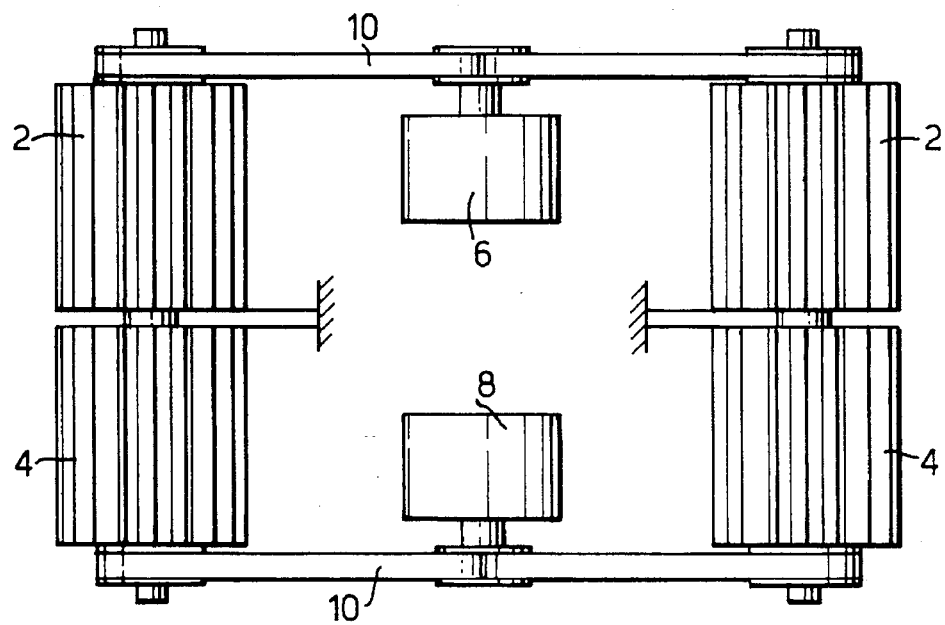
FIG. 2 is an equally schematic top view, showing only the undercarriage of the robot.

Referring now to the drawings, there are seen in FIGS. 1 and 2 schematically simplified views of the per se known robot used in the system according to the invention.

Locomotion of the robot along and across the pool floor is effected by two pairs of plastic traction brushes 2 and 4, each pair independently driven by its own electric motor 6 and 8, respectively. Power is transmitted by non-slipping timing belts 10 and steering is effected by varying the relative speeds of motors 6 and 8.

Further seen in FIG. 1 is a box 12 accommodating an electric motor (not shown) driving an impeller 14 which draws the pool water carrying the solid deposits by way of a slot 16 in the bottom of box 12 through a filter bag (not shown) and expels the filtered water through an aperture 18 in the top of housing 20. Power and signals are fed to the robot via an umbilical cable 22 leading to an intercommunication box (see FIG. 10) located at one of the pool sides and advantageously mounted on a caddy or trolley on which the robot is transported to and from the pool.

Further accommodated in the robot is the electronic circuitry in the form of a microprocessor, to be discussed further below.

Navigation of the robot is based on "teaching" the robot in a data acquisition mode the route programmed for a specific pool, monitoring execution of that route and correcting any deviations from that route. To this end, it must be possible to determine the instantaneous location of the robot within the pool in terms of x,y-coordinates, which is done by means of triangulation. The base of the triangulation triangles is the known and fixed distance between two stationary elements positioned at the pool sides and serving either as signal sources or as signal receivers, and the apex is the robot itself.

Figure 3:
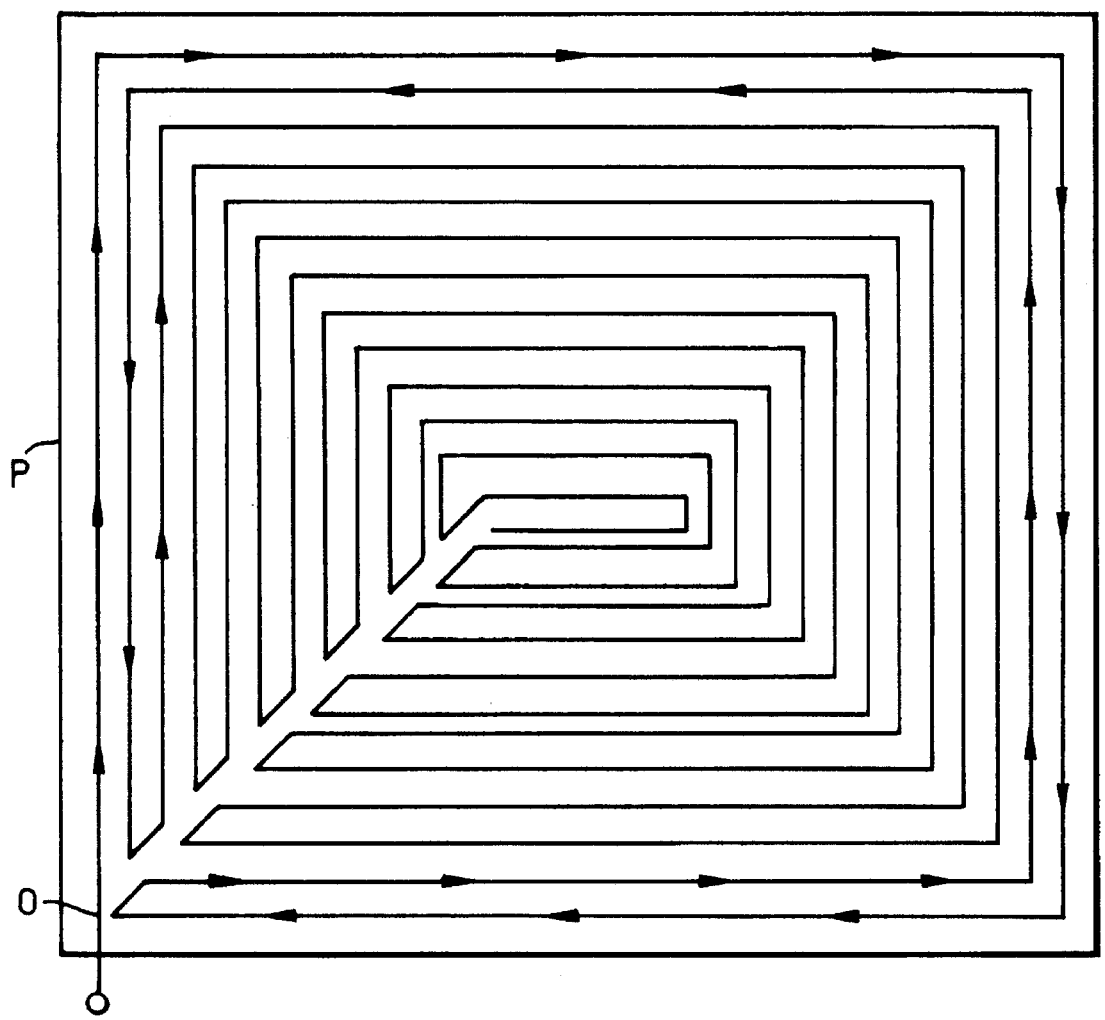
FIG. 3 shows a typical route map along which the robot travels, covering the pool's entire floor area.

FIG. 3 shows a pool map, illustrating a possible route to be taken by the robot in order to fully cover the pool floor, with the pool P outlined in bold. It is seen that the robot proceeds along a path generally spiralling inwards, starting from coordinates 0,0. However, having completed the first turn of the spiral, say, in the clockwise sense, the robot moves inwards for the pitch distance of the spiral (about 50 cm) and travels along the second turn in the counterclockwise sense, reversing the sense of travel for each successive turn. This strategy is devised to prevent excessive twisting of the umbilical cable 22.

Figure 4:
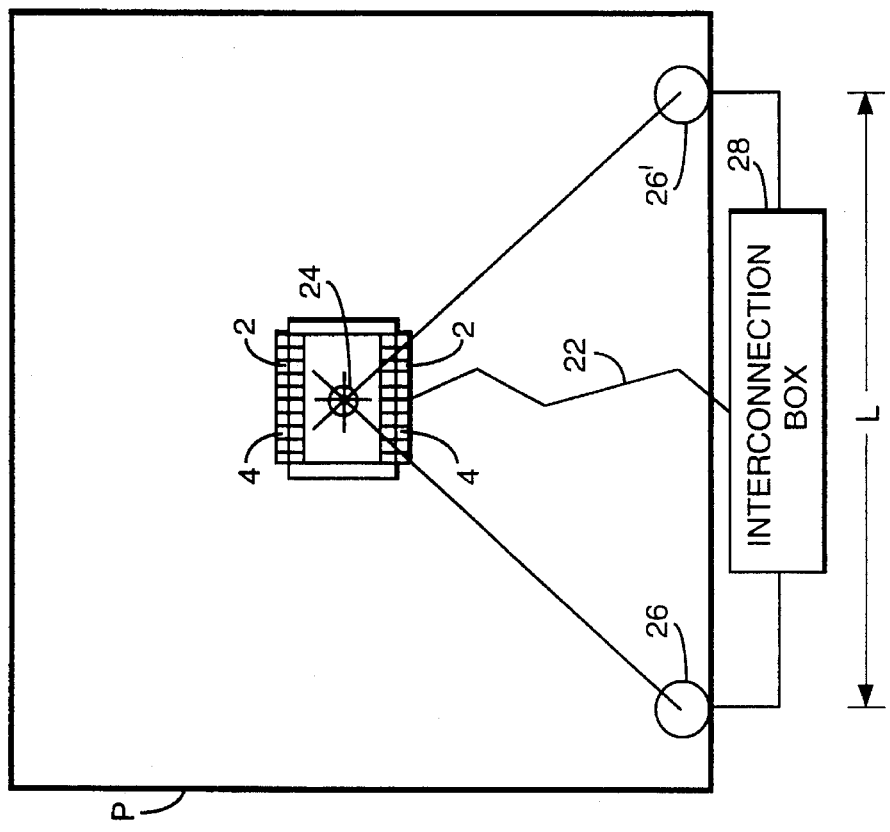
FIG. 4 represents the layout and components of a first embodiment of the system according to the invention.

FIG. 4 shows a first embodiment of the arrangement for triangulation, based on ultrasonic range detection. The robot carries a generator 24 producing an ultrasonic "ping" every 5 sec. At the side of the pool P there are disposed two hydrophones 26, 26' at a mutual distance L, which constitutes the known triangulation base. The other two sides of the triangle, $\overline{26,24}$ and $\overline{26',24}$, are automatically calculated as a function of the time it takes the sound from the generator 24 to reach each one of the hydrophones 26, 26' and permit determination of the instantaneous robot location. Via an interconnection box 28, the data from the hydrophones 26, 26' are transferred to the on-board microprocessor over the umbilical cable 22, to compare the actual robot location with the location as determined by the predetermined program and to effect a positional correction, if such be necessary.

Figure 5:
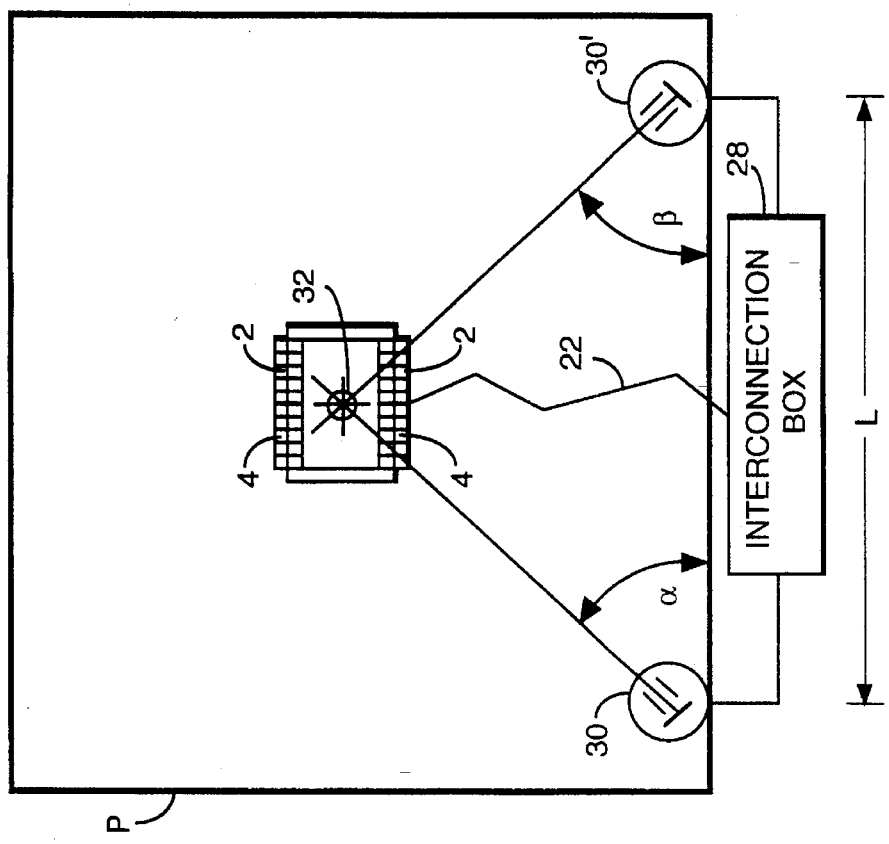
FIG. 5 illustrates the layout and components of a second embodiment of the system.

FIG. 5 represents an electro-optical solution of the triangulation problem. There are seen two rotatable, direction-sensitive light detectors 30, 30' sealingly mounted in transparent acrylic cylinders and immersed in the water at a mutual distance of L, adjacent to a pool side. Each one of detectors 30, 30' is mechanically coupled with a high-resolution shaft encoder (not shown) coaxial with, and driven by, an electric motor rotating advantageously at a rate of 60 rpm. A modulated nondirectional light source 32 is mounted inside an acrylic dome on top of the robot. A maximum signal at detectors 30, 30' indicates that the respective detector is pointing directly at light source 32, at which instant the angle is read off the shaft encoder of each detector, yielding the base angles α and β which, together with the base L, permit the determination of the robot location and, as in the previous embodiment, correction of that location if required. The output signals of detectors 30, 30' as well as the reading of the shaft encoders are fed via the interconnection box 28 and the umbilical cable 22 to the on-board microprocessor of the robot.

Another electro-optical triangulation arrangement is illustrated in FIG. 6. There, the triangulation base is defined by two stationary light detectors 34, 34'. A highly directional, rotatable light source 36, such as a laser transmitter, is mounted under a transparent acrylic dome on top of the robot and is mechanically coupled with an electric motor coaxial with a high-resolution shaft encoder. A maximum signal is produced by detectors 34, 34' when hit by the beam from the rotating light source 36. This, with the aid of the shaft encoder, facilitates the determination of angles α and β, and thus of the actual location of the robot.

However, as the difference in height between the pool edge and the light source 36 varies due to the slope of the pool floor, means must be provided to ensure that the rotating laser beam will always hit the detectors 34, 34', even when the robot is at the deeper section of the pool.

Figure 7:
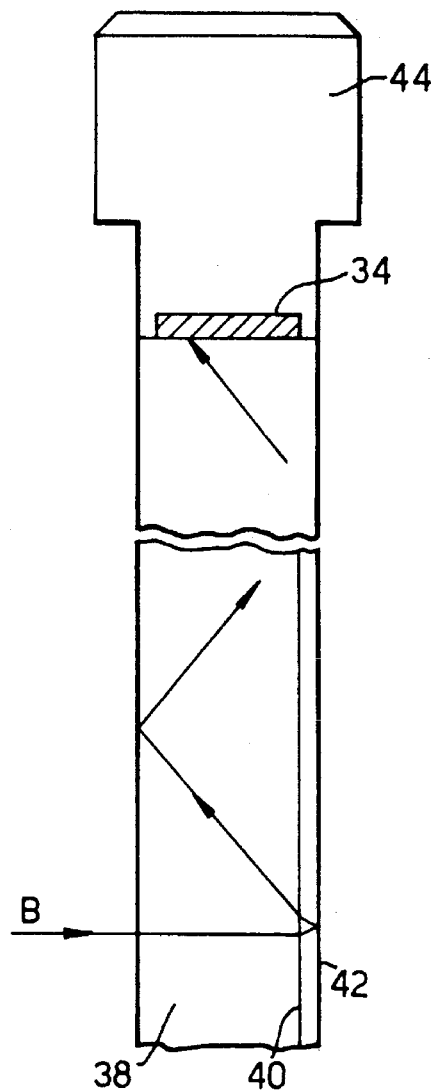
FIG. 7 is a schematic representation of the light collector for the embodiment of FIG. 6.

The solution to this problem is represented in FIG. 7. There is seen a light-collector rod 38 made of a transparent plastic material, carrying a transmission grating 40, behind which is arranged a reflector 42. In dependence on the given wavelength of the light source 36, grating 40 is configured to maximize first-order beams and minimize zero and other order beams.

As seen in FIG. 7, a light ray B from source 36 which hits grating 40 at an angle of incidence of about 0° is diffracted, producing a first-order beam that hits reflector 42 at an angle of incidence of about 30°, is then reflected, and arrives at grating 40 (from the rear) at the same angle of incidence. Passing through grating 40 to be again diffracted, it arrives at the opposite wall of rod 38 at an angle of incidence of about 60° which, given the indices of refraction of the media involved ($N_{rod}$=1.5; $N_{water}$=1.33), is beyond the critical angle, producing total internal reflexion that confines the beam inside rod 38 and carries it upwards until it hits detector 34. Rod 38 must, of course, be long enough to intercept the beam also from the deepest positions of the beam. Head 44 accommodates a preamplifier to be connected to the interconnection box 28 (FIG. 6).

Yet another embodiment of the triangulation concept of the system according to the invention is illustrated in FIG. 8. There is seen, mounted under a transparent acrylic dome on top of the robot, a rotatable, highly direction-sensitive light detector 46 mechanically coupled with a high-resolution shaft encoder (not shown) driven by an electric motor. There are further provided four nondirectional light sources in the form of high-intensity infrared transmitters 48, 50, 52 and 54, attached below water level to one each of the pool walls, substantially at the center of the pool length and the pool width, thus dividing the pool into four quadrants I, II, III, IV. Each light source is modulated at a different frequency, enabling the robot to determine immediately in which quadrant it is moving, the two sources of that particular quadrant defining the instantaneous base for triangulation. At maximum stimulation of detector 46, the angle is read off the shaft encoder and the robot location is determined by triangulation. This embodiment is particularly suitable for very large swimming pools, as the large area is subdivided into smaller "cells," enhancing navigation accuracy.

Figure 9:
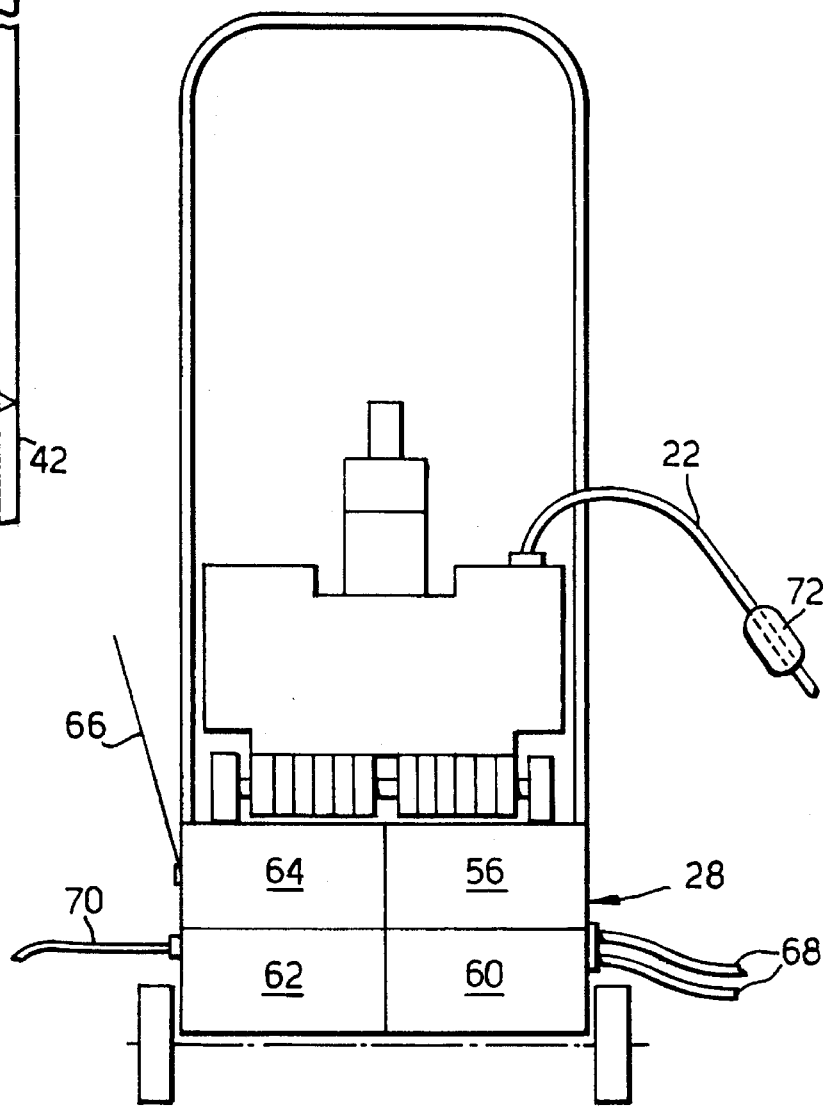
FIG. 9 is a schematic representation of the wheeled caddy that carries the robot as well as several units of the "on shore" equipment.

FIG. 9 schematically represents the wheeled caddy on which the robot is transported between, say, a storeroom and the pool. Also accommodated on the caddy are the already-mentioned interconnection box 28, which carries a transformer module 56 that, over an umbilical cable 22, supplies electric power to the robot and its electronic circuitry; a light-detector processing logic 60 for processing signals from the pool-side detectors such as detectors 30, 30' of FIG. 5; an over-the-power-line modem 62 for transmitting the processed data over the umbilical cable 22 to the on-board microprocessor of the robot, and a wireless receiver 64 with an aerial 66. With the aid of a manual remote-control unit which overrides the automatic system, the robot can be manually controlled when, for instance, the system breaks down. It is also possible to walk the robot around the pool, using the above wireless control, to teach its navigation processor, in a data acquisition mode of the latter, the intended route. Cables 68 lead to the detectors 30, 30' at the pool wall, while cable 70 connects the caddy to the mains.

The umbilical cable 22 is provided with a plurality of appropriately spaced floats 72.

Figure 10:
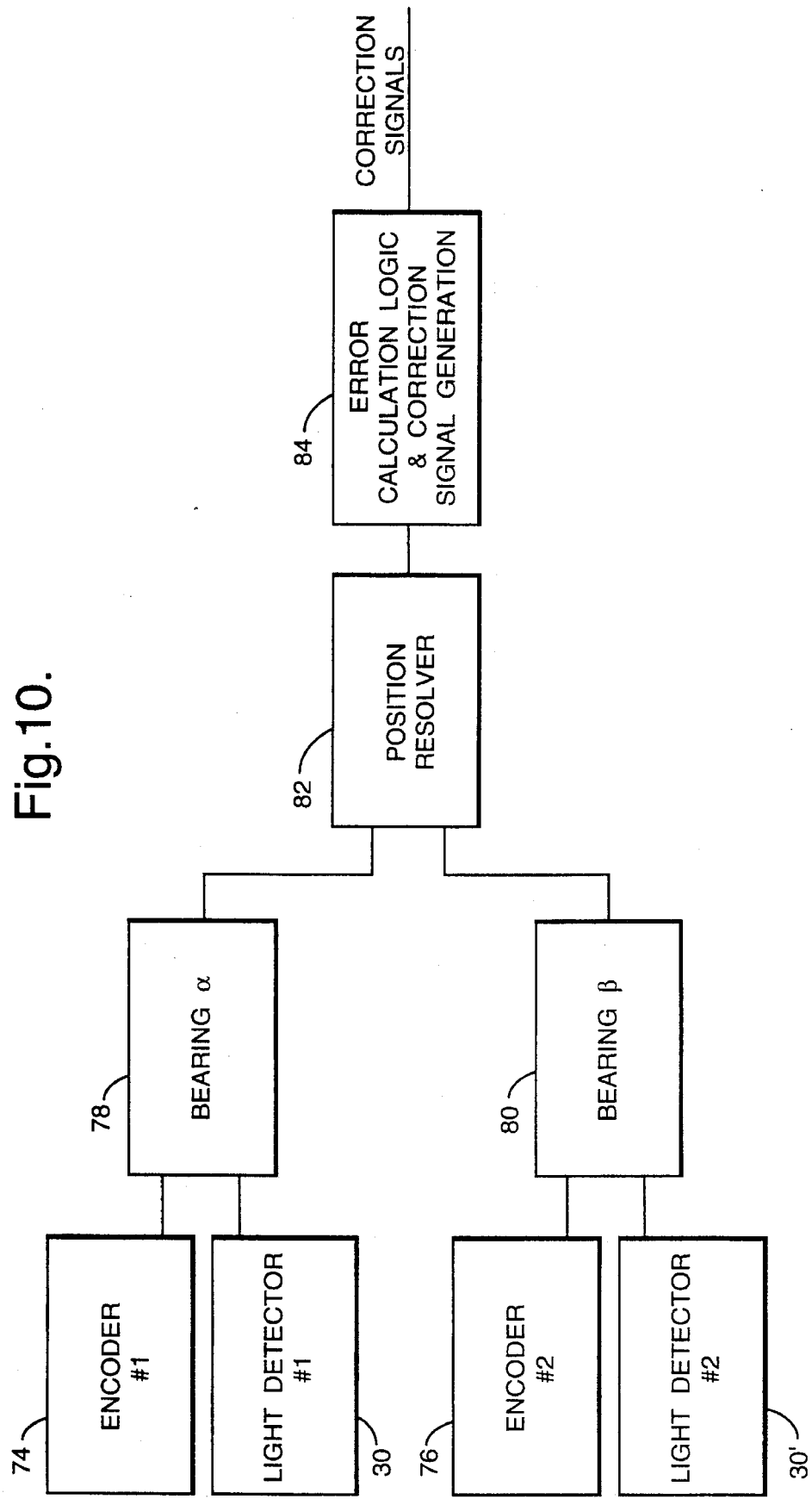
FIG. 10 is a block diagram of the navigation control logic of the embodiment of FIG. 5.

FIG. 10 is a block diagram representing the navigation control logic of such an embodiment as illustrated in FIG. 5. There are seen light detector 30 as coupled to shaft encoder 74 and light detector 30' as coupled to shaft encoder 76. The base angles α and β at any instant are determined in encoder readers 78, 80, and the instantaneous position of the triangle apex, i.e., of the robot, is calculated in position resolver 82. The resolved data are transferred to error calculation logic 84 which also generates an appropriate correction signal to the motor control system, which can either speed up or slow down the traction motors 6 and 8, or can deflect the robot by driving each of the pairs of traction brushes 2 and 4 at a different speed or even in a different sense.

Figure 11:
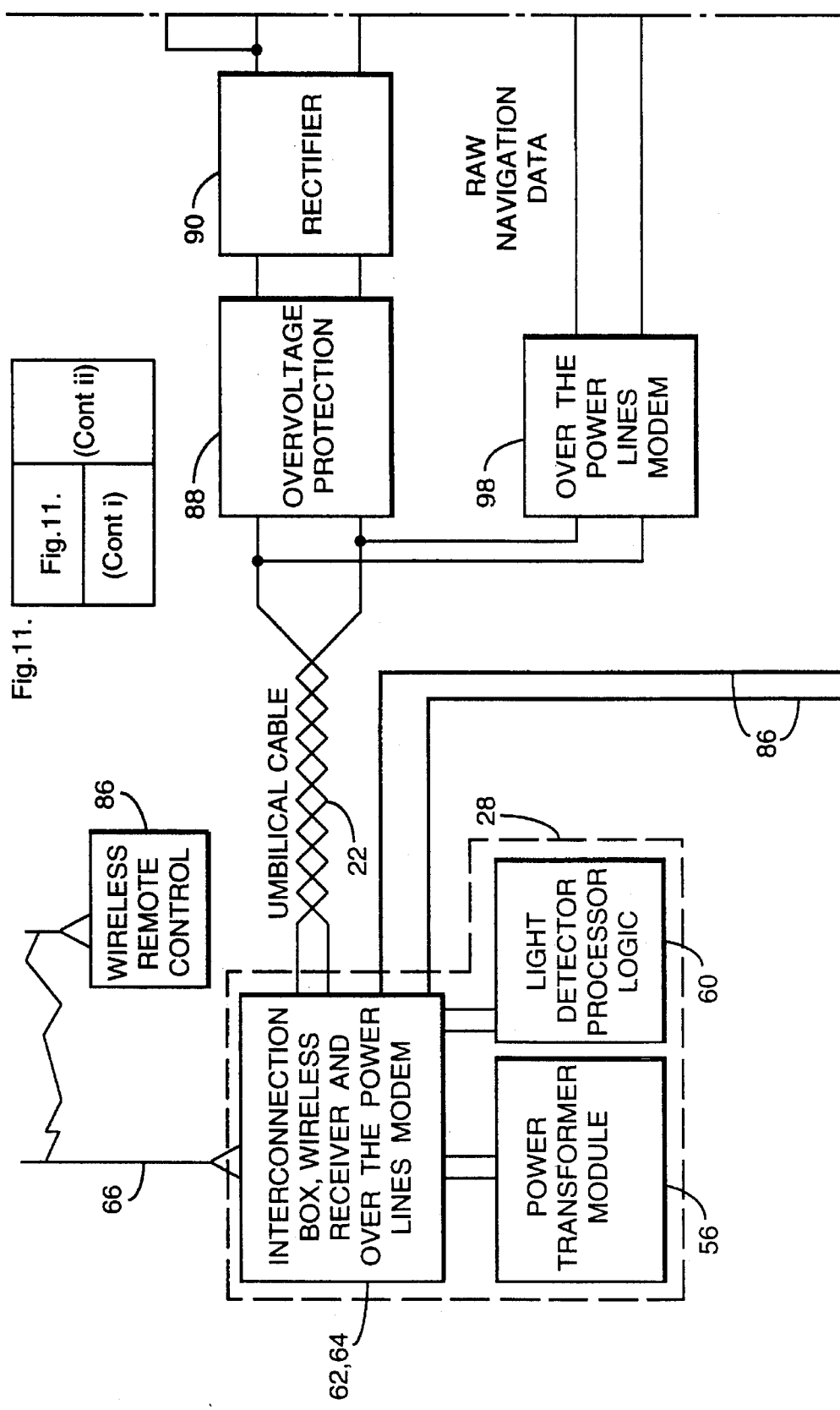
FIG. 11 is a block diagram of the entire system as exemplified in the embodiment of FIG. 5.

FIG. 11 is a block diagram of the entire system as exemplified in the embodiment of FIG. 5. There is seen the interconnection box 28 with its units as explained in conjunction with FIG. 9, as well as the hand-held, joystick-operated manual remote control 86. The umbilical cable 22 leads to an overvoltage protection unit 88, a rectifier 90 and a regulator unit 92, providing power to motors 6 and 8, and, via the motor and hardware control processor 84, also to the impeller motor 96.

Also connected to umbilical cable 22 is the receiving over-the-power-line modem 98 which feeds the raw navigation data generated in interconnection box 28 to motor and hardware processor 96 and navigation processor 98. Other inputs of processor 96 are listed at its left. Sensors at its right include an RPM sensor of impeller motor 94, a position sensor (in the form of a mercury switch) which responds when the robot dangerously tilts, a water sensor responsive to water break-in, and a temperature sensor. Processor 96 is also equipped with a parallel flash memory 100.

Navigation processor 98 is fed the triangulation data and produces correction signals if correction is required. Processor 98 is equipped with a static ROM 102.

Also seen is nondirectional light source 32. Light detectors 30, 30' are driven by gear motors 104. The output of detectors 30, 30' is tapped off by slip rings 106.

Cleaning according to the route map of FIG. 3 starts at coordinates 0,0 along the first track. Travelling speed is preset and can only be affected by excesssive slipping. Each 10 cm or less, locating coordinates are provided by the triangulation system. These coordinates are compared to route map coordinates originally read into the processor memory. Any difference between the coordinates will be translated into directions correction data and fed into the motor control processor.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A swimming pool cleaning, navigational controlled system, comprising:

a robot;

locomotion means for said robot for producing a steerable motion therefor;

impeller means, movable with said robot, for drawing solids-entraining water from the floor of said pool through filter means for filtering the solids-entraining water, the filter means being mounted adjacent to, and upstream of, said impeller means, and returning said water after filtering to said pool;

microprocessor means associated with said robot for controlling said locomotion means for causing said robot to follow a preprogrammed route, and to generate correction signals whenever, at a given instant, the actual location of said robot deviates from said preprogrammed route;

signal-producing means carried by said robot;

at least two signal-detecting means defining together with said signal producing means a stationary triangulation base and being fixedly mounted in spaced-apart relationship at, or in close proximity to each other, on at least one side of said pool and being acted upon by said signal-producing means;

a mobile triangle apex being defined by said signal-producing means together with said signal detecting means; and coupling means located on the ground in proximity to said pool and comprising a detector processing logic to receive and process data from said detecting means for transmission to said microprocessor means;

wherein the actual robot location is determined by triangulation of said stationary triangulation base defined by said at least two spaced-apart signal-detecting means and the mobile triangle apex.

2. The system as claimed in claim 1 wherein said coupling means includes an umbilical cable for coupling said transmission means with said robot, as well as for transmitting, by means of over-the-power-lines modems, said processed data to said microprocessor.

3. The system as claimed in claim 1 wherein said coupling means includes a transformer unit to supply power to said robot and said microprocessor means, as well as to said signal-producing and detecting means.

4. The system as claimed in claim 1, wherein said signal-producing means is an ultrasound generator carried by said robot and said signal-detecting means are hydrophones disposed at one of the sides of said pool.

5. The system as claimed in claim 1, wherein said signal-producing means is a water-immersible, nondirectional light source carried by said robot.

6. The system as claimed in claim 1, wherein said signal-detecting means are water-immersible, direction-sensitive light detectors, each mechanically coupled to a shaft encoder, each encoder adapted to be rotated by an electric motor.

7. The system as claimed in claim 1, wherein said signal-producing means is a water-immersible, directional light source mounted on said robot and mechanically coupled to a shaft encoder adapted to be rotated by an electric motor.

8. The system as claimed in claim 1, wherein said signal-detecting means are two stationary light detectors, each mounted in an elongated, transparent, substantially vertically immersed light-collector rod, each rod carrying an axially-disposed transmission grating behind which is arranged a reflecting surface, to the effect that a light ray impacting said grating at a small angle of incidence is made to impact, from the inside thereof, the wall of said rod at an angle of incidence larger than the critical angle, thus producing total internal reflection that carries said beam upwards to meet said light detector.

9. The system as claimed in claim 1, wherein said coupling means includes a wireless receiver addressable by a hand-held wireless remote control unit for manually controlling said robot.

10. A swimming pool cleaning, navigational controlled system, comprising:

a robot;

locomotion means for said robot capable of producing a steerable motion therefor;

impeller means, movable with said robot, for drawing solids-entraining water from the floor of said pool through filter means for filtering the water, the filter means being mounted adjacent to, and upstream of, said impeller means, and returning said water after filtering to said pool;

microprocessor means provided in said robot for controlling said locomotion means for causing said robot to follow a preprogrammed route, and to generate correction signals whenever, ar a given instant, the actual location of said robot deviates from said preprogrammed route;

signal-detecting means carried by said robot;

at least two signal-producing means, together with said signal detecting means defining a stationary triangulation base, being fixedly mounted in spaced-apart relationship at, or in close proximity to each other, on at least one side of said pool and acting on said signal-detecting means;

a mobile triangle apex being defined by said signal-detecting means together with said signal producing means; and transmission means located on the ground in proximity to said pool and comprising a detector processing logic to receive and process data from said detecting means for transmission to said microprocessor means;

wherein the actual location of said robot is determined by triangulation of said stationary triangulation base comprising said at least two spaced-apart signal-producing means and the mobile triangle apex.

11. The system as claimed in claim 10, wherein said signal-producing means are four high-intensity light sources, attached below water level to the walls of said pool, one source to each wall, each source being modulated to a different frequency.

12. The system as claimed in claim 10, wherein said signal-detecting means is a direction-sensitive light detector mounted on said robot and mechanically coupled to a shaft encoder adapted to be rotated by an electric motor.

13. The system as claimed in claim 10, wherein said coupling means includes an umbilical cable for coupling said transmission means with said robot for transmitting, by means of over-the-power-lines modems, said processed data to said microprocessor.

14. The system as claimed in claim 10, wherein said coupling means includes a transformer unit to supply power to said robot and said microprocessor means, as well as to said signal-producing and detecting means.

15. The system as claimed in claim 10, wherein said coupling means includes a wireless receiver addressable by a hand-held wireless remote control unit for manually controlling said robot.

* * * * *